United States Patent
Johansson et al.

(10) Patent No.: US 7,158,533 B2
(45) Date of Patent: Jan. 2, 2007

(54) SELF-CONFIGURING WIRELESS MOBILE DATA BASE STATIONS AND CONFIGURATION OPERATIONS AND COMPUTER PROGRAM PRODUCTS FOR SAME

(75) Inventors: Mikael Johansson, Gothenburg (SE); Elena Casanova, Cary, NC (US); Anders Gothe, Torso (SE)

(73) Assignee: Ericsson Inc., Research Triangle Park, NC (US)

( * ) Notice: Subject to any disclaimer, the term of this patent is extended or adjusted under 35 U.S.C. 154(b) by 965 days.

(21) Appl. No.: 10/046,874

(22) Filed: Jan. 15, 2002

(65) Prior Publication Data

US 2003/0134663 A1    Jul. 17, 2003

(51) Int. Cl.
*H04J 3/16* (2006.01)
*H04L 12/66* (2006.01)
*H04M 1/38* (2006.01)

(52) U.S. Cl. .................. 370/466; 370/352; 370/401; 370/254; 455/557

(58) Field of Classification Search ............ 370/395.5, 370/397, 389, 399, 395.2, 395.52, 352, 254, 370/255, 329, 395.63, 465, 470, 241.1, 252, 370/253; 455/418, 419, 420; 710/8, 9, 10, 710/18, 19
See application file for complete search history.

(56) References Cited

U.S. PATENT DOCUMENTS

| | | | |
|---|---|---|---|
| 5,521,914 A * | 5/1996 | Mavraganis et al. ........ 370/352 |
| 5,940,768 A * | 8/1999 | Thro et al. ................... 455/507 |
| 5,983,090 A | 11/1999 | Aoki |
| 6,041,228 A * | 3/2000 | Niska et al. ................. 455/419 |
| 6,145,019 A * | 11/2000 | Firooz et al. .................. 710/8 |
| 6,188,675 B1 * | 2/2001 | Casper et al. ............... 370/254 |
| 6,272,129 B1 * | 8/2001 | Dynarski et al. ........... 370/356 |
| 6,278,708 B1 * | 8/2001 | Von Hammerstein et al. .......................... 370/389 |
| 6,538,988 B1 * | 3/2003 | Natarajan et al. ........... 370/216 |
| 6,898,425 B1 * | 5/2005 | Wilhelmsson et al. ...... 455/423 |
| 6,920,116 B1 * | 7/2005 | Hossain et al. ............. 370/329 |

OTHER PUBLICATIONS

Budka et al., "Cellular Digital Packet Data Networks," Bell Labs Technical Journal, Summer 1997, pp. 164-181.

* cited by examiner

*Primary Examiner*—Hanh Nguyen
(74) *Attorney, Agent, or Firm*—Myers Bigel Sibley & Sajovec PA

(57) ABSTRACT

A wireless base station of a wireless mobile data communications system, such as a Mobile Data Base Station (MDBS) of a Cellular Digital Packet Data (CDPD) communications system, is configured. A packet, such as a frame relay frame, is communicated from a node of a packet data network to the wireless base station to configure the wireless base station to use a predetermined address, e.g., a Data Link Connection Identifier (DLCI), in the packet data network. The present invention may be implemented as methods, apparatus, and computer program products.

13 Claims, 5 Drawing Sheets

SELF-CONFIGURING WIRELESS MOBILE DATA BASE STATIONS AND CONFIGURATION OPERATIONS AND COMPUTER PROGRAM PRODUCTS FOR SAME

BACKGROUND OF THE INVENTION

The present invention relates to wireless communications systems and methods, and more particularly, to wireless mobile data communications systems.

Wireless communications technologies are widely used to provide communications services. For example, cellular mobile telephone systems are used throughout the world to provide telephone voice services. Wireless communications services are also widely used to provide text and other messaging services, such as paging services.

A growing market for the application of wireless communications technologies is the provision of data communications services. For example, wireless mobile data communications systems are now used to provide wireless wide area networking such that mobile users, such as salespeople, maintenance personnel, and the like, may use networked applications. Wireless mobile data communications systems may also be used to provide mobile internet services.

A conventional Cellular Digital Packet Data (CDPD) communications system 110 is illustrated in FIG. 1. The CDPD system 110 includes multiple Mobile Data Intermediate Systems (MD-IS) 111 and a Network Management System (NMS) 112 that are linked by a CDPD backbone network 113. The MD-IS's 111 control communications with respective groups of Mobile Data Base Stations (MDBSs) 116, which are shown as coupled to the CDPD backbone network by a router 114 and frame relay network 115. The MD-IS's 111, the MDBSs 116 and associated network hardware provide means for Mobile End Stations (M-ESs) 120 to communicate data with one another and/or with an external network (e.g., an internet) 130. Commonly, the MDBSs 116 communicate with the MD-ISs 111 and the NMS 112 using a transport layer/network layer stack such as TCP/IP (Transport Control Protocol over Internet Protocol), UDP/IP (User Datagram Protocol over Internet Protocol) or TP4/CNLP (Transport Protocol 4 over Connectionless Network Protocol). A detailed discussion of CDPD may be found in "Cellular Digital Packet Data Networks," by Budka et al., Bell Labs Technical Journal, Summer 1997, pp. 164–181. Other wireless mobile data communications systems include General Packet Radio System, which provides packet data communications for Global System for Mobile Communications (GSM) and other Time-Division Multiple Access (TDMA) systems, as well as CDMA (Code Division Multiple Access) and UMTS (Universal Mobile Telecommunications System).

Wireless mobile data communications systems commonly use existing wireless voice communications infrastructure. For example, CDPD services may be provided by fitting existing Advanced Mobile Phone System (AMPS) base stations with supplemental hardware that enables these base stations to serve as MDBSs in the CDPD network. It is generally desirable that the installation and maintenance of such MDBSs be efficient and cost effective.

SUMMARY OF THE INVENTION

According to embodiments of the present invention, a wireless base station of a wireless mobile data communications system, such as a Mobile Data Base Station (MDBS) of a Cellular Digital Packet Data (CDPD) communications system, is configured. A packet, such as a frame relay frame, is communicated from a node of a packet data network to the wireless base station to configure the wireless base station to use a predetermined address, for example, a Data Link Connection Identifier (DLCI), in the packet data network. The present invention may be implemented as methods, apparatus and computer program products.

DETAILED DESCRIPTION

Figure 1:
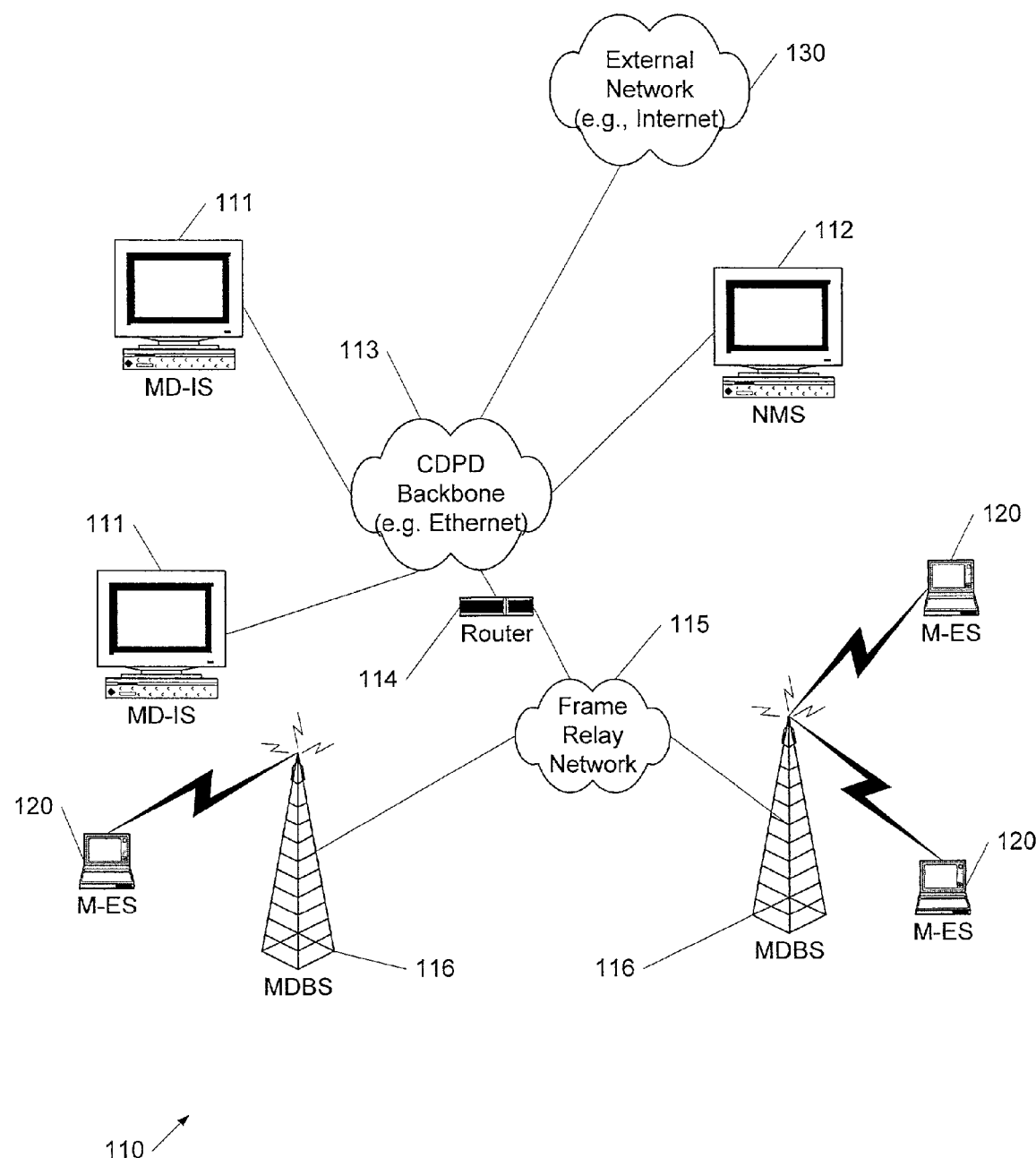
FIG. 1 is a schematic diagram illustrating a CDPD communications system according to the prior art.

The present invention will now be described more fully with reference to the accompanying drawings, in which typical embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The exemplary embodiments described herein specifically relate to "plug and play" configuration of a Mobile Data Base Station (MDBS) that is coupled to a backbone network of a Cellular Digital Packet Data (CDPD) communications system by a frame relay node. It will be appreciated, however, that the present invention is also applicable to other wireless data communications systems, such as General Packet Radio Systems (GPRS). It will be further appreciated that the present invention is also applicable to base stations coupled to wireless data communications systems using other packet data interfaces, such as X.25 and other link layer protocols, as well as higher-level packet protocols, such as Internet Protocol (IP), Connectionless Protocol (CNLP), Transport Control Protocol (TCP) and Transport Protocol 4 (TP4).

In the present application, FIGS. 1–5 are schematic diagrams and flowcharts illustrating exemplary communications apparatus and operations according to embodiments of the present invention. It will be understood that blocks of the schematic diagrams and flowcharts, and combinations of blocks therein, may be implemented using one or more electronic circuits, such as circuits included in a wireless terminal or in a wireless communications system, for example, in a wireless mobile data base station or other component of a wireless mobile data communications system. It will also be appreciated that, in general, blocks of the schematic diagrams and flowcharts, and combinations of blocks therein, may be implemented in one or more electronic circuits, such as in one or more discrete electronic components, one or more integrated circuits (ICs) and/or one or more application specific integrated circuits (ASICs), as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the operations specified in the block or blocks. The computer program instructions may also be executed on a computer or other data processing apparatus to cause a series of operations to be performed on the computer or other programmable apparatus to produce a computer implemented process such that the instructions which execute on the computer or other programmable apparatus provide operations for implementing the operation specified in the block or blocks.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in a wireless terminal or a wireless communications system and/or in an apparatus and/or storage medium operable to program such memory. Accordingly, blocks of the schematic diagrams and flowcharts of FIGS. 1–5 support electronic circuits and other means that perform the specified operations, acts for performing the specified operations, and computer program products configured to perform the specified operations.

Figure 2:
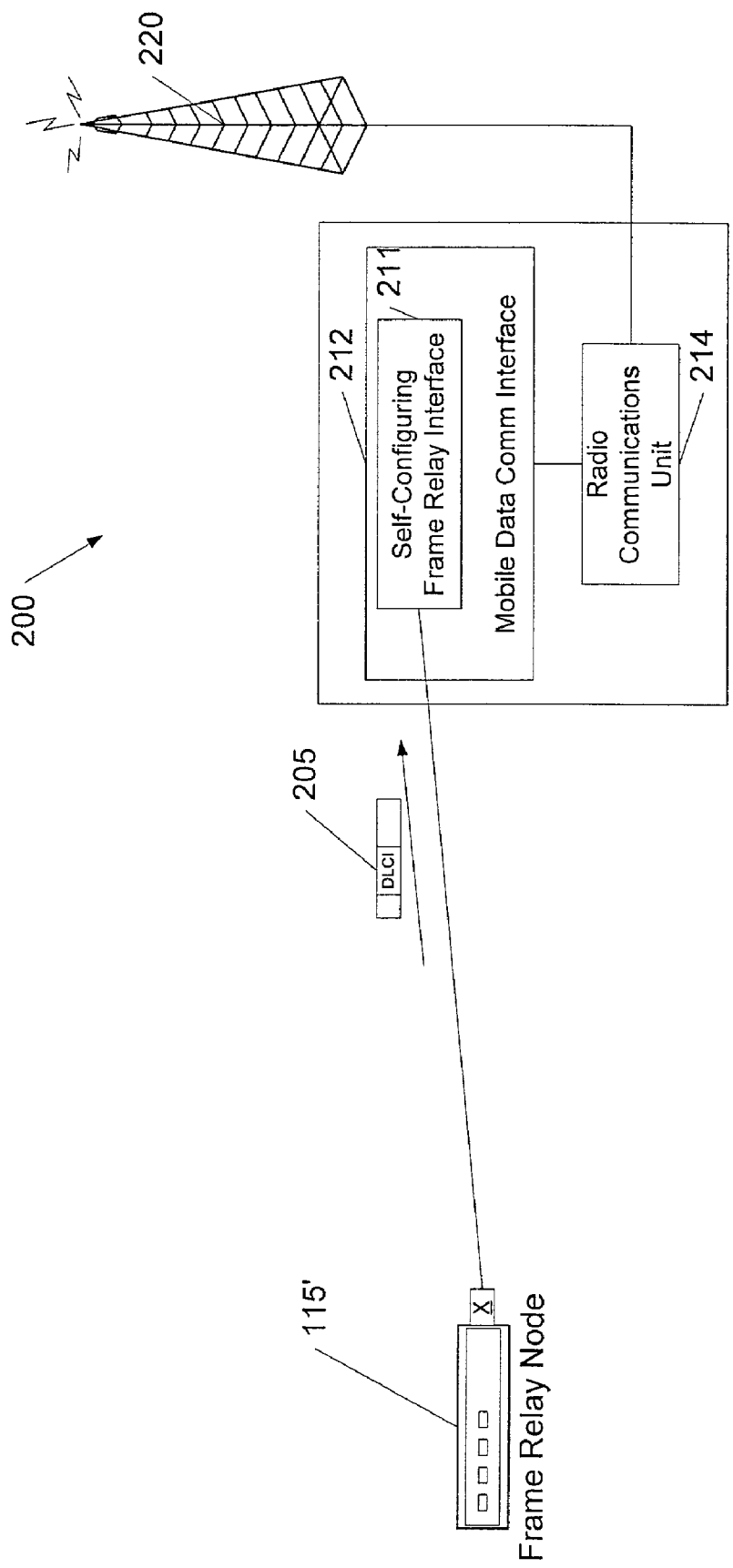
FIG. 2 is a schematic diagram illustrating a wireless base station according to some embodiments of the present invention.

FIG. 2 illustrates a wireless base station according to embodiments of the present invention, in particular, a Mobile Data Base Station (MDBS) 200 for a Cellular Digital Packet Data (CDPD) communications system. As shown, the MDBS 200 includes a radio communications unit 214 that supports radio communications interface with terminals, e.g., cellular telephones and CDPD Mobile End Stations (MESs), via a base station antenna 220. The MDBS 200 further includes a mobile data communications interface 212 that provides communications between the radio communications unit 214 and a frame relay node 115' connected to a CDPD backbone network (not shown in FIG. 2). The mobile data communications interface 212 further includes a self-configuring frame relay interface 211 that is operative, responsive to receipt of a frame 205 sent from the frame relay node 115', to configure itself to use the Data Link Connection Identifier (DLCI) in the received frame 205 as its frame relay address.

It will be appreciated that the radio communications unit 214, the mobile data communications interface 212 and the self-configuring frame relay interface 211 may, in general, be implemented using any of a variety of hardware, software (or firmware), and combinations thereof. For example, the radio communications unit 214 may include analog and/or digital signal processing components such as mixers, modulators, demodulators, amplifiers, filters and associated control circuitry. The mobile data communications interface 212 and the self-configuring frame relay interface 211 may, for example, be implemented as one or more program code modules that implement protocol layers and other control structures using a general or special purpose data processing circuit, such as a microprocessor. It will be further appreciated that, although the radio communications unit 214, the mobile data communications interface 212 and the self-configuring frame relay interface 211 are illustrated in FIG. 2 as being co-located, these components may be distributed over multiple locations. The present invention may also be embodied as computer program code embodied in a storage medium configured such that computer program code executed on a computer or data processing device provides the functions of the self-configuring frame relay interface 211 of the mobile data communications interface 212.

Figure 3:
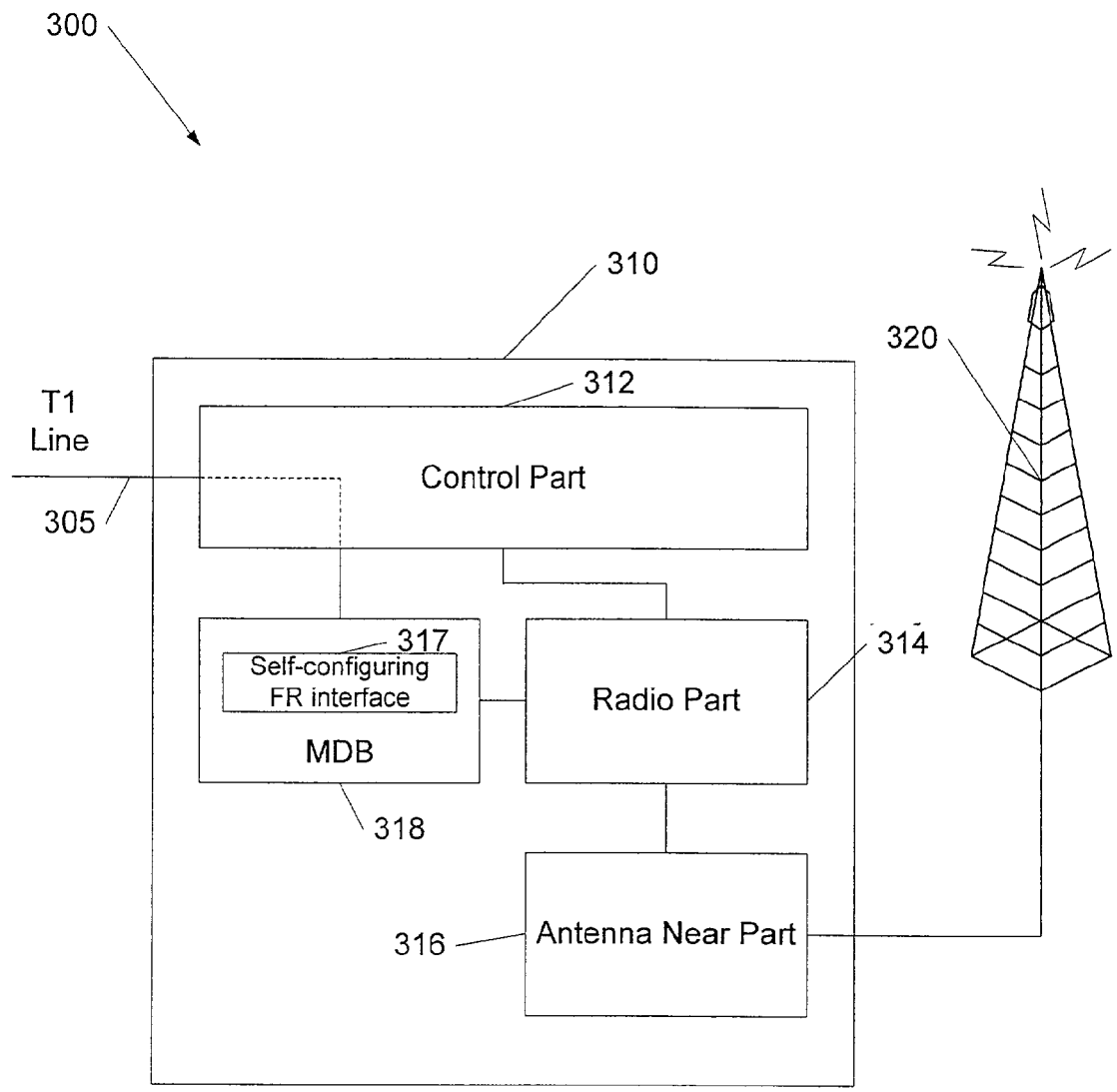
FIG. 3 is a schematic diagram illustrating a wireless base station according to other embodiments of the present invention.

FIG. 3 illustrates a wireless base station 300 according to other embodiments of the present invention. As shown, the wireless base station 300 includes circuitry 310 that includes a control part 312 that sends and receives signals via a communications line, e.g., a T1 telephone line 305. The control part 312 controls operations of a radio part 314, to provide radio communications with mobile terminals via an antenna near part 316 and an antenna part 320. To provide an MDBS functionality, the circuitry 310 further includes a Mobile Data Board (MDB) 318 that provide a data communications interface between the T1 line 305 and the radio part. As shown, the MDB 318 includes a self-configuring frame relay interface circuit 317 that provides frame relay communications between the base station 310 and a frame relay node (not shown in FIG. 3), and that is operative to configure itself to use a DLCI included in a frame received from the frame relay node.

In a wireless mobile data communications base station, such as the base stations 200, 300 of FIGS. 2 and 3, a dedicated communications link is often used between a packet data network node, e.g., the frame relay node 115' of FIG. 3, and the base station. The packet data network node is often a pre-existing node that has an addressing setup that is previously established. When a wireless mobile data communications base station is installed or replaced according to some conventional techniques, address configuration typically is performed manually at the MDBS.

The present invention arises from the realization that, because of the dedicated connection between the node and the base station, transmissions to the base station on the link between the packet data network and the base station can typically be limited to packets intended for the base station. Accordingly, it is possible to achieve "plug and play" configuration of the base station by using address information included in packets transmitted by the connecting node, e.g., the DLCI automatically included in a Local Management Interface (LMI) or other frame transmitted by the frame relay node connected to the base station. Considering the time and expense that may be involved in manually configuring geographically dispersed base stations, such plug and play capability can provide significant cost savings to a system operator and/or an equipment vendor by, for example, reducing configuration errors and associated site visits and reducing installation time.

Figure 4:
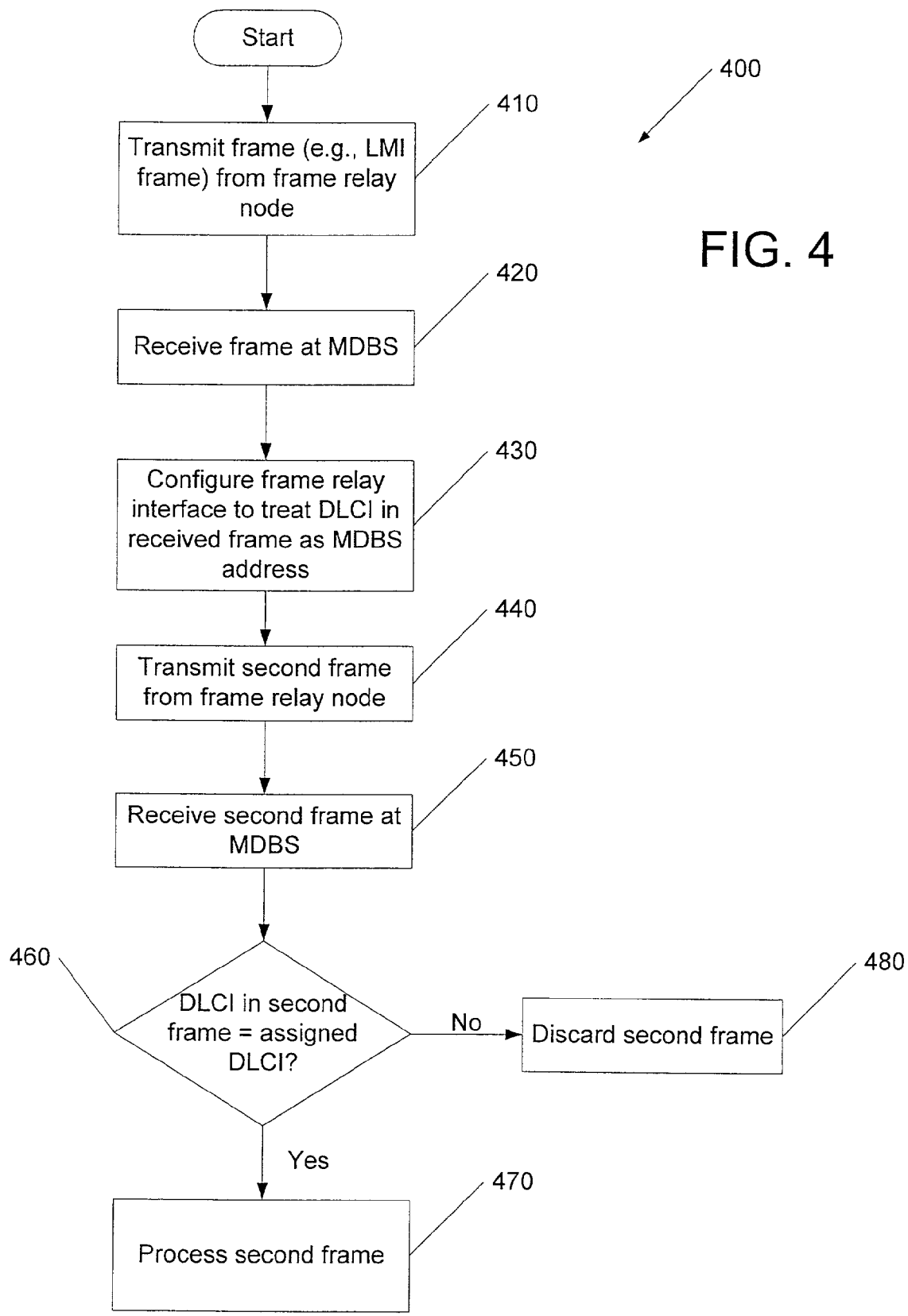
FIGS. 4 and 5 are flowcharts illustrating exemplary operations according to various embodiments of the present invention.

FIG. 4 illustrates exemplary operations 400 using such a plug and play configuration procedure for a base station, such as the CDPD MDBS 300 of FIG. 3, according to embodiments of the present invention. A frame is transmitted from a frame relay node to an MDBS (Block 410). For example, the transmitted frame may be a Local Management Interface (LMI) frame that is periodically transmitted by the frame relay node to monitor the status of a Permanent Virtual Circuit (PVC) between the frame relay node and the MDBS. The frame is received at the MDBS (Block 420), and the frame relay interface of the MDBS responsively configures itself to treat the DLCI in the received frame as its frame relay address (Block 430). For example, the MDBS may reboot and configure a software process implementing a frame relay stack based on the received DLCI.

Upon transmission and receipt of a subsequent second frame (Blocks 440, 450), the MDBS examines the received second frame to see if it includes the previously assigned DLCI (Block 460). Consistent with conventional frame relay operations, if the second frame includes the assigned DLCI, the MDBS processes the frame to recover information therein (Block 470). For example, the MDBS may pass the frame to a process implementing a higher level protocol(s), such as a process implementing TCP/IP (Transport Control Protocol/Internet Protocol) or TP4/CNLP (Transport Protocol 4/Connectionless Protocol). If the second frame does not include the proper DLCI, the MDBS discards the second frame (Block 480).

Figure 5:
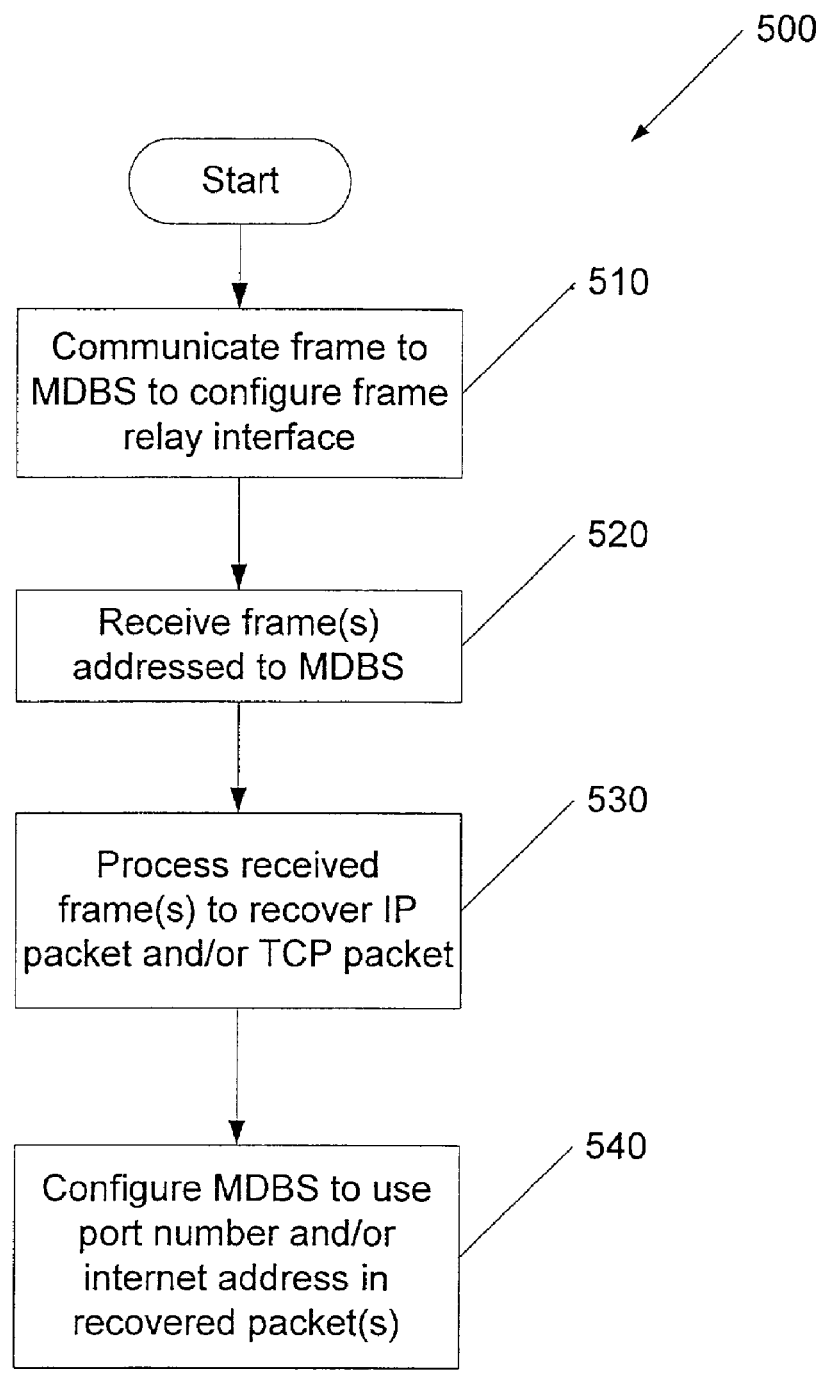

FIG. 5 illustrates exemplary operations 500 according to still further embodiments of the present invention. A frame is communicated to a MDBS from a frame relay node to configure the MDBS frame relay interface (Block 510). One or more additional frames are then received at the MDBS (Block 520). Responsive to receipt of the one or more frames, the received one or more frames is processed to recover one or more higher level protocol packets, e.g. one or more TCP, UDP or IP datagrams (Block 530). The MDBS is then configured to use the port number and/or internet address in the recovered one or more packets (Block 540). An example of a such a configuration process is described in U.S. patent application Ser. No. 10/047,859 to Johansson et al., entitled "METHODS, APPARATUS AND COMPUTER PROGRAM PRODUCTS FOR CONFIGURING A NETWORK INTERFACE OF A WIRELESS MOBILE DATA BASE STATION", filed filed Jan. 15, 2002 and incorporated by reference herein in its entirety.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A wireless base station for use in a wireless mobile data communications system, the wireless base station comprising:
    a radio communications unit operative to communicate radio signals to and from mobile terminals; and
    a mobile data communications interface coupled to the radio communications unit and configured to connect to a node of a packet data network to provide communications between the wireless base station and the packet data network, the mobile data communications interface comprising a self-configuring frame relay interface operative to receive a frame from a frame relay node connected to the mobile data communications interface and to configure itself to use a Data Link Connection Identifier (DLCI) in the received frame as its frame relay address.

2. A wireless base station according to claim 1, wherein the mobile data communications interface is operative to process information in a packet received from the node of the packet data network according to a protocol residing above the protocol of the packet data network to assign an identifier to the wireless base station.

3. A wireless base station according to 2, wherein the protocol above the packet data network protocol comprises at least one of a transport protocol and a network protocol, and wherein the assigned identifier comprises at least of a port number and an internet address.

4. A wireless base station according to claim 3, wherein the wireless mobile data communications system comprises a Cellular Digital Packet Data (CDPD) system, and wherein the wireless base station comprises a Mobile Data Base Station (MDBS).

5. A wireless base station according to claim 1, wherein the wireless mobile data communications system comprises a Cellular Digital Packet Data (CDPD) system, and wherein the wireless base station comprises a Mobile Data Base Station (MDBS).

6. A wireless base station according to claim 1, wherein the self-configuring frame relay interface is operative to configure itself to use the Data Link Connection Identifier (DLCI) in the received frame as its frame relay address without requesting a frame relay address.

7. A Mobile Data Base Station (MDBS) for a Cellular Digital Packet Data (CDPD) communications system, the MDBS comprising:
    a radio communications unit operative to communicate radio signals to and from mobile terminals; and
    a mobile data communications interface coupled to the radio communications unit and configured to connect to a frame relay node coupled to a backbone network of the CDPD communications system, the mobile data communications interface including a self-configuring frame relay interface operative, responsive to receipt of a frame from the frame relay node, to configure itself to use a Data Link Connection Identifier (DLCI) in the received frame as a DLCI for the MDBS.

8. An MDBS according to claim 7, wherein the self configuring frame relay interface is operative, responsive to receipt of a Local Management Interface (LMI) frame from the frame relay node, to configure itself to use a Data Link Connection Identifier (DLCI) in the received LMI frame as a DLCI for the MDBS.

9. An MDBS according to claim 7, wherein the self-configuring frame relay interface is operative, responsive to receipt of a frame from the frame relay node, to configure itself to configuring a frame relay stack based on the DLCI in the received frame.

10. An MDBS according to claim 7, wherein the mobile data communications interface is further operative to process at least one received frame to recover a datagram and to configure itself to use at least one of a port number and an internet address in the received datagram.

11. An MDBS according to claim 7, wherein the self configuring frame relay interface is operative to configure itself to use the Data Link Connection Identifier (DLCI) in the received frame as a DLCI for the MDBS without requesting a DLCI.

12. A computer program product for configuring a Mobile Data Base Station (MDBS) of a Cellular Digital Packet Data (CDPD) communications system, the computer program product comprising program code embodiment in a computer-readable storage medium, the computer program code comprising:
    program code for providing communications between the MDBS and a frame relay node of a frame relay network; and
    program code for configuring the program code for providing communications between the MDBS and a frame relay node of a frame relay network to use a Data Link Connection Identifier (DLCI) in a packet received from the frame relay node of the frame relay network as an address for the MDBS.

13. A computer program product according to claim 12, wherein the program code for configuring the program code for providing communications between the MDBS and a frame relay node of a frame relay network to use a Data Link Connection Identifier (DLCI) in a packet received from the frame relay node of the frame relay network as an address for the MDBS is configured to configure the program code for providing communications between the MDBS and a frame relay node of a frame relay network to use the DLCI as an address for the MDBS without requesting an address from the MDBS.

* * * * *